A. D. MOSBY.
LIQUID MEASURING DEVICE.
APPLICATION FILED SEPT. 29, 1911.
1,024,415.
Patented Apr. 23, 1912.
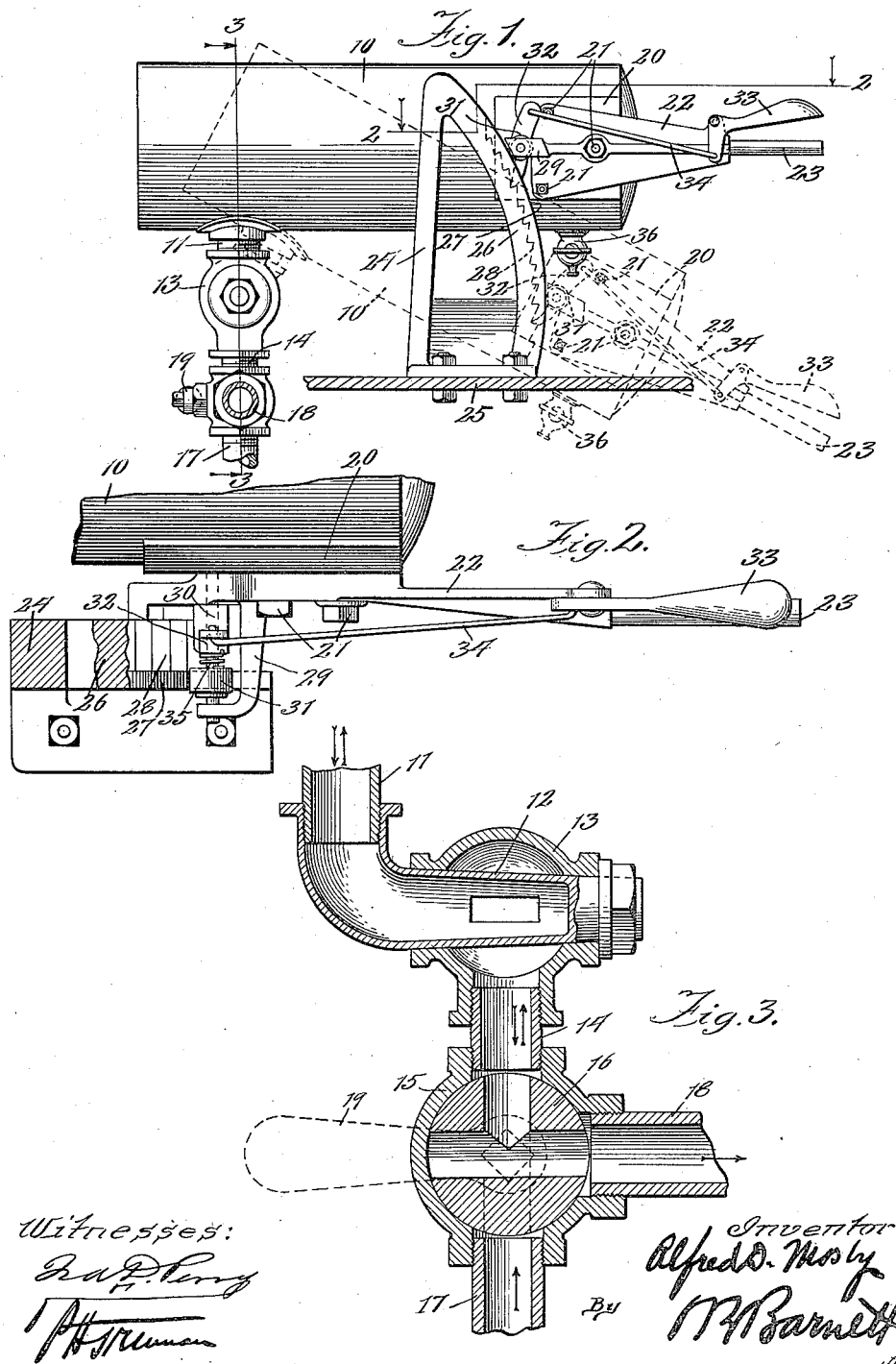

UNITED STATES PATENT OFFICE.

ALFRED D. MOSBY, OF CHICAGO, ILLINOIS, ASSIGNOR TO MARSH-CAPRON MANUFACTURING COMPANY, OF CHICAGO, ILLINOIS, A CORPORATION OF ILLINOIS.

LIQUID-MEASURING DEVICE.

1,024,415.      Specification of Letters Patent.      Patented Apr. 23, 1912.

Original application filed February 23, 1911, Serial No. 610,154. Divided and this application filed September 29, 1911. Serial No. 651,914.

*To all whom it may concern:*

Be it known that I, ALFRED D. MOSBY, a citizen of the United States, residing at Chicago, in the county of Cook and State of Illinois, have invented certain new and useful Improvements in Liquid-Measuring Devices, of which the following is a specification.

My invention relates to a liquid measuring device and the invention has for its object to provide a device of novel and improved construction for measuring out definite volumes of liquid which by simple adjustment of the device can be varied, within certain limits, as may be desired.

This applicaton is a division of my application entitled "Concrete mixing apparatus" filed February 23, 1911, and bearing Serial No. 610,154.

The invention is shown in a preferred embodiment in the accompanying drawings, wherein—

Figure 1 is a side elevation of the device. Fig. 2 is a fragmentary sectional plan taken on line 2—2 of Fig. 1; and Fig. 3 a vertical sectional view taken on line 3—3 of Fig. 1 looking in the direction of the arrows.

Like characters of reference indicate like parts in the several figures of the drawings.

Referring to the drawings, 10 designates a measuring tank which is connected by the union 11 with the goose neck 12 of an ordinary swivel joint, the other member of which is designated 13. The latter is connected by a union 14 with the casing 15 of the three-way valve 16. A supply pipe 17 and a discharge pipe 18 are tapped into the casing 15. The three-way valve 16 may be provided with any desired means for manipulating it. The valve may be turned by hand, in which case it may be provided, as shown, with the handle 19.

The measuring tank has secured thereto at one end the plate 20 to which is attached by the bolts 21 a plate 22 provided with a handle 23. 24 designates a standard, shown as bolted to the stationary member 25 and formed with the curved element 26 concentric with the swivel joint 12, 13. The element 26 is formed with the smooth portion or track 27 and with the toothed portion or rack 28. The plate 22 is formed with a projecting bracket 29 sustaining the outer end of a pin 30 carrying the roller 31, which bears on the track 27, and a dog 32 adapted to engage with one of the teeth of the rack 28. A hand grip 33 is pivoted to the outer end of plate 22 and is connected with the dog 32 by the link 34. A spiral spring 35, one end of which is anchored in the pin 30 and the other end in the dog 32, normally holds the dog in engagement with the rack 28. The tank is preferably provided with a drain cock 36.

It will be seen that the measuring tank 10 is pivotally mounted and may be set at different angular positions. Assuming the tank to have been filled (the three-way valve during the filling being in position to put supply pipe 17 in communication with the tank), the entire contents of the tank, valve 16 having been shifted back so as to be brought to the position shown in Fig. 3, will be discharged into pipe 18. By setting the tank in any of its oblique positions, a certain amount of the liquid in the tank will be held back and trapped. The angular adjustment of the tank will, therefore, determine the volume discharged at each measuring operation. It will be understood that pipe 17 is connected to a supply of liquid having sufficient head to fill the tank when valve 16 is turned to the filling position.

While I have described a preferred form of my invention, it will be understood that there might be some changes in the form, construction and arrangement of the parts employed without departing from the invention. Therefore, I do not limit myself to these particulars except so far as the same are made specifically limitations on certain of the claims herein.

I claim:

1. A measuring device for liquids comprising a supply and a discharge pipe a pivotally mounted tank having a port constituting an inlet and outlet, means for putting said port into communication either with the supply or discharge pipe as desired and means for setting said tank in different angular positions so as to trap more or less of the liquid, substantially as described.

2. A measuring device for liquids comprising a pivotally mounted tank having a port constituting an inlet and outlet, supply and discharge pipes, a three-way valve interposed between said port and said supply and discharge pipes, and means for setting said tank in different angular positions so as to trap more or less liquid, substantially as described.

3. A measuring device for liquids comprising a tank, a pipe through which said tank is adapted to fill and discharge and upon which the tank is pivotally mounted, and means for setting said tank at different angular positions for the purpose described.

4. A measuring device for liquids comprising a tank, a pipe section tapped into the bottom thereof, supply and discharge pipes, a three-way valve, a swivel joint connecting said pipe section and said three-way valve, and means for setting said tank in different angular positions, for the purpose described.

5. A measuring device for liquids comprising a pivoted tank, a supply and a discharge pipe, means for putting the tank into communication either with the supply pipe or the discharge pipe, a rack, and means for supporting said tank at different positions on the rack so as to give it different degrees of angularity, for the purpose described.

6. A measuring device for liquids comprising a tank, an inlet and outlet pipe for the tank provided with a swivel joint, supply and discharge pipes, a valve adapted to put the inlet and outlet pipe into communication alternately with the supply and discharge pipes, and means for setting said tank at different angular positions.

7. A measuring device for liquids comprising a tank, an inlet and outlet pipe for the tank provided with a swivel joint, supply and discharge pipes, a valve adapted to put the inlet and outlet pipe into communication alternately with the supply and discharge pipes, a handle on the tank, a standard formed with a track concentric with said swivel joint, a roller which bears against the track, a rack, and a pivoted dog provided with a hand grip and link adapted to engage said rack.

ALFRED D. MOSBY.

Witnesses:
  P. H. TRUMAN,
  L. A. FALKENBERG.

---

Copies of this patent may be obtained for five cents each, by addressing the "Commissioner of Patents, Washington, D. C."